United States Patent
He et al.

(10) Patent No.: US 11,543,925 B2
(45) Date of Patent: Jan. 3, 2023

(54) TOUCH STRUCTURE, METHOD FOR MANUFACTURING SAME, TOUCH DEVICE, AND METHOD FOR DETERMINING TOUCH POSITION

(71) Applicants: Hefei Xinsheng Optoelectronics Technology Co., Ltd., Anhui (CN); Beijing BOE Technology Development Co., Ltd., Beijing (CN)

(72) Inventors: Min He, Beijing (CN); Xiaodong Xie, Beijing (CN); Jing Wang, Beijing (CN); Lei Zhang, Beijing (CN); Yaying Li, Beijing (CN); Tengfei Zhong, Beijing (CN)

(73) Assignees: Hefei Xinsheng Optoelectronics Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 405 days.

(21) Appl. No.: 16/477,588

(22) PCT Filed: Nov. 19, 2018

(86) PCT No.: PCT/CN2018/116225
§ 371 (c)(1),
(2) Date: Jul. 12, 2019

(87) PCT Pub. No.: WO2019/174295
PCT Pub. Date: Sep. 19, 2019

(65) Prior Publication Data
US 2021/0405812 A1 Dec. 30, 2021

(30) Foreign Application Priority Data
Mar. 13, 2018 (CN) .......................... 201810204720.8

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 2203/04103* (2013.01); *G06F 2203/04104* (2013.01)

(58) Field of Classification Search
CPC .............. G06F 3/0446; G06F 3/04164; G06F 2203/04103; G06F 2203/04104
(Continued)

(56) References Cited

U.S. PATENT DOCUMENTS 6,297,811 B1 * 10/2001 Kent ..................... G06F 3/0443
345/173
9,542,055 B2   1/2017 Yang et al.
(Continued)

FOREIGN PATENT DOCUMENTS

CN      203224862 U    10/2013
CN      203643988 U    6/2014
(Continued)

OTHER PUBLICATIONS

Jan. 22, 2020—(CN) First Office Action Appn 201810204720.8 with English Translation.
(Continued)

*Primary Examiner* — Mark Edwards
(74) *Attorney, Agent, or Firm* — Banner & Witcoff, Ltd.

(57) ABSTRACT

A touch structure, a method of manufacturing same, a touch device, and a method for determining a touch position are provided. The touch structure includes a first touch unit and the first trace. The first touch unit includes a first touch electrode and a second touch electrode that are adjacent to each other and insulated from each other. The first touch electrode and the second touch electrode are both self-
(Continued)

capacitance electrodes and both have a thin end and a thick end that are arranged opposite to each other. The first trace includes a first sub-trace and a second sub-trace is coupled to the first touch electrode and the second sub-trace is coupled to the second touch electrode.

20 Claims, 6 Drawing Sheets

(58) Field of Classification Search
USPC .......................................................... 345/73
See application file for complete search history.

(56) References Cited

U.S. PATENT DOCUMENTS

| | | | | |
|---|---|---|---|---|
| 2013/0154996 | A1* | 6/2013 | Trend | G06F 3/0445 |
| | | | | 345/174 |
| 2014/0139239 | A1* | 5/2014 | Zachut | G06F 3/0448 |
| | | | | 324/658 |
| 2015/0193064 | A1 | 7/2015 | Lu et al. | |
| 2015/0261358 | A1 | 9/2015 | Liu | |
| 2016/0274727 | A1* | 9/2016 | Nakamura | G06F 3/0448 |
| 2017/0108971 | A1 | 4/2017 | Yang et al. | |
| 2017/0206394 | A1 | 7/2017 | Chiang et al. | |
| 2017/0277310 | A1* | 9/2017 | Xiong | G06F 3/0412 |

FOREIGN PATENT DOCUMENTS

| | | | |
|---|---|---|---|
| CN | 104503653 | A | 4/2015 |
| CN | 205353969 | U | 6/2016 |
| CN | 206312114 | U * | 7/2017 |
| CN | 206312114 | U | 7/2017 |
| CN | 206388155 | U | 8/2017 |

OTHER PUBLICATIONS

Nov. 9, 2021—(EP) Extended European Search Report Appn 18897867.0.

* cited by examiner

TOUCH STRUCTURE, METHOD FOR MANUFACTURING SAME, TOUCH DEVICE, AND METHOD FOR DETERMINING TOUCH POSITION

The application is a U.S. National Phase Entry of International Application No. PCT/CN2018/116225 filed on Nov. 19, 2018, designating the United States of America and claiming priority to Chinese Patent Application No. 201810204720.8 filed on Mar. 13, 2018. The present application claims priority to and the benefit of the above-identified applications and the above-identified applications are incorporated by reference herein in their entirety.

TECHNICAL FIELD

Embodiments of the present disclosure relate to a touch structure, a method of manufacturing the touch structure, a touch device, and a method for determining a touch position.

BACKGROUND

Touch technologies include single touch technology and multi-touch technology. Upon each touch, single touch can be used to identify only one touch point, and multi-touch technology can be used to identify at least two touch points simultaneously.

Capacitive touch technology is widely used due to its high sensitivity, long life, and high light transmittance. The capacitive touch technology may be divided into touch technology using the mutual-capacitance principle and touch technology using the self-capacitance principle. Compared with the touch technology using the mutual-capacitance principle, the touch sensing technology using the self-capacitance principle has higher accuracy and higher signal-to-noise ratio.

At present, the multi-touch technology using the self-capacitance principle has gradually become a new research hotspot.

SUMMARY

Embodiments of the present disclosure provide a touch structure, a method of manufacturing the touch structure, a touch device comprising the touch structure, and a touch method for determining a touch position by using the touch structure. The touch structure may be realized by using the self-capacitance principle.

At least an embodiment of the present disclosure provides a touch structure. The touch structure comprises a first touch unit. The first touch unit comprises a first touch electrode and a second touch electrode that are adjacent to each other and insulated from each other. The first touch electrode and the second touch electrode are both self-capacitance electrodes and both have a thin end and a thick end that are arranged opposite to each other. The touch structure further comprises a first trace. The first trace comprises a first sub-trace and a second sub-trace. The first sub-trace is coupled to the first touch electrode and the second sub-trace is coupled to the second touch electrode.

For example, in the touch structure provided by at least an embodiment of the present disclosure, a planar shape of the first touch electrode and a planar shape of the second touch electrode both have a wedge-shaped profile, and a main body of the first touch electrode and a main body of the second touch electrode both have a grid shape.

For example, in the touch structure provided by at least an embodiment of the present disclosure, the planar shape of the first touch electrode and the planar shape of the second touch electrode are same and an edge of the planar shape of the first touch electrode and an edge of the planar shape of the second touch electrode that are closed to each other are substantially parallel to each other.

For example, in the touch structure provided by at least an embodiment of the present disclosure, a gap between the first touch electrode and the second touch electrode has a width less than or equal to 30 micrometers.

For example, in the touch structure provided by at least an embodiment of the present disclosure, materials of the first touch electrode and the second touch electrode comprise metal.

For example, in the touch structure provided by at least an embodiment of the present disclosure, a main body of the first trace has a grid shape.

For example, in the touch structure provided by at least an embodiment of the present disclosure, a plurality of the first traces are located in a same layer as the first touch unit.

For example, in the touch structure provided by at least an embodiment of the present disclosure, a ratio of an extended length of the first touch electrode from the thin end to the thick end to a width of the thick end is in a range of [n, n+1), and a ratio of an extended length of the second touch electrode from the thin end to the thick end to a width of the thick end is in a range of [n, n+1), wherein n is a positive integer.

For example, in the touch structure provided by at least an embodiment of the present disclosure, the touch structure comprises a plurality of first touch units, and the plurality of first touch units are arranged in an array.

For example, in the touch structure provided by at least an embodiment of the present disclosure, the thin ends of a plurality of the first touch electrodes located in a same row have a same orientation, and the thin ends of a plurality of the second touch electrodes located in a same row have a same orientation.

For example, in the touch structure provided by at least an embodiment of the present disclosure, among two first touch units that are adjacent to each other and located in a same row, an edge of the second touch electrode in one of the two first touch units is adjacent to an edge of the first touch electrode in the other of the two first touch units, and two adjacent edges are substantially parallel to each other.

For example, in the touch structure provided by at least an embodiment of the present disclosure, the thin end of the first touch electrode is closed to the thick end of the second touch electrode, and the thick end of the first touch electrode is closed to the thin end of the second touch electrode.

For example, in the touch structure provided by at least an embodiment of the present disclosure, a planar shape of the first touch unit is substantially a parallelogram.

For example, the touch structure provided by at least an embodiment of the present disclosure further comprises: a plurality of electrode pins configured to be coupled to a plurality of the first traces, wherein the plurality of electrode pins are located on a side of a touch area same as the plurality of first touch units, and the plurality of the first traces are configured to be extended within the touch area and leave the touch area from the side of the touch area same as the plurality of electrode pins.

For example, the touch structure provided by at least an embodiment of the present disclosure further comprises: a second touch unit, comprising a third touch electrode and a fourth touch electrode, wherein the third touch electrode and the fourth touch electrode are adjacent to each other and insulated from each other, and the third touch electrode and the fourth touch electrode are both self-capacitance electrodes and both comprise a thin end and a thick end that are arranged opposite to each other; and a second trace, comprising a third sub-trace and a fourth sub-trace, wherein the third sub-trace is coupled with the third touch electrode, and the fourth sub-trace is coupled with the fourth touch electrode, wherein the second touch unit is located in a layer different from the first touch unit and the second touch unit is arranged at a position corresponding to a gap between the first touch units that are adjacent in a row direction.

At least an embodiment of the present disclosure further provides a touch device, comprising the afore-mentioned touch structure.

At least an embodiment of the present disclosure further provides a method of manufacturing a touch structure, comprising: forming a first touch electrode layer, wherein the first touch electrode layer comprises a first touch unit and a first trace, the first touch unit comprises a first touch electrode and a second touch electrode that are adjacent to each other and insulated from each other, the first touch electrode and the second touch electrode are both self-capacitance electrodes and both comprise a thin end and a thick end that are arranged opposite to each other, the first trace comprises a first sub-trace and a second sub-trace, the first sub-trace is coupled with the first touch electrode, and the second sub-trace is coupled with the second touch electrode.

The method provided by at least an embodiment of the present disclosure further comprising: forming a second touch electrode layer, wherein the second touch electrode layer comprises a second touch unit and a second trace, the second touch unit comprises a third touch electrode and a fourth touch electrode that are adjacent to each other and insulated from each other, the third touch electrode and the fourth touch electrode are both self-capacitance electrodes and both comprise a thin end and a thick end that are arranged opposite to each other, the second trace comprises a third sub-trace and a fourth sub-trace, the third sub-trace is coupled with the third touch electrode, the fourth sub-trace is coupled with the fourth touch electrode; the second touch unit is located in a layer different from the first touch unit, and the second touch unit is arranged at a position corresponding to a gap between the first touch units that are adjacent in a row direction.

At least an embodiment of the present disclosure further provides a method for determining a touch position by using the touch structure, the touch structure comprising only the first touch electrode, and the method comprises: determining an electrode that is touched according to an amount of change in a self-capacitance of each of the first touch electrode in the first touch unit and an amount of change in a self-capacitance of each of the second touch electrode in the first touch unit; determining a touch position, according to an amount of change in self-capacitance of each region of the electrode that is touched.

At least an embodiment of the present disclosure further provides a method for determining a touch position by using the touch structure, the touch structure comprising the first and second touch electrodes, and the method comprises: determining an electrode that is touched, according to an amount of change in a self-capacitance of each of the first touch electrode in the first touch unit, and an amount of change in a self-capacitance of each of the second touch electrode in the first touch unit, and an amount of change in a self-capacitance of each of the third touch electrode in the second touch unit, and an amount of change in the fourth touch electrode in the second touch unit; determining a touch position, according to an amount of change in self-capacitance of each regions of the electrode that is touched.

Embodiments of the present disclosure provide a touch structure, a method for manufacturing the touch structure, a touch device, a method for determining a touch position. The touch structure comprises a first touch unit. The first touch unit comprises a first touch electrode and a second touch electrode that are adjacent to each other and insulated from each other. The first touch electrode and the second touch electrode are both self-capacitance electrodes and both have a thin end and a thick end that are arranged opposite to each other. The touch structure further comprises a first trace. The first trace comprises a first sub-trace and a second sub-trace. The first sub-trace is coupled to the first touch electrode and the second sub-trace is coupled to the second touch electrode. The touch structure can realize multi-touch, for example, a flexible three-sided frameless multi-point touch screen can be formed. In at least one embodiment of the present disclosure, by providing a second touch unit different from the first touch unit, and placing the second touch unit between the first touch units adjacent to each other in a row direction, a touch structure with higher sensitivity can be realized, for example, a flexible three-sided frameless multi-touch screen supporting for recognizing the touch of an active pen can be formed.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

Figure 1A:
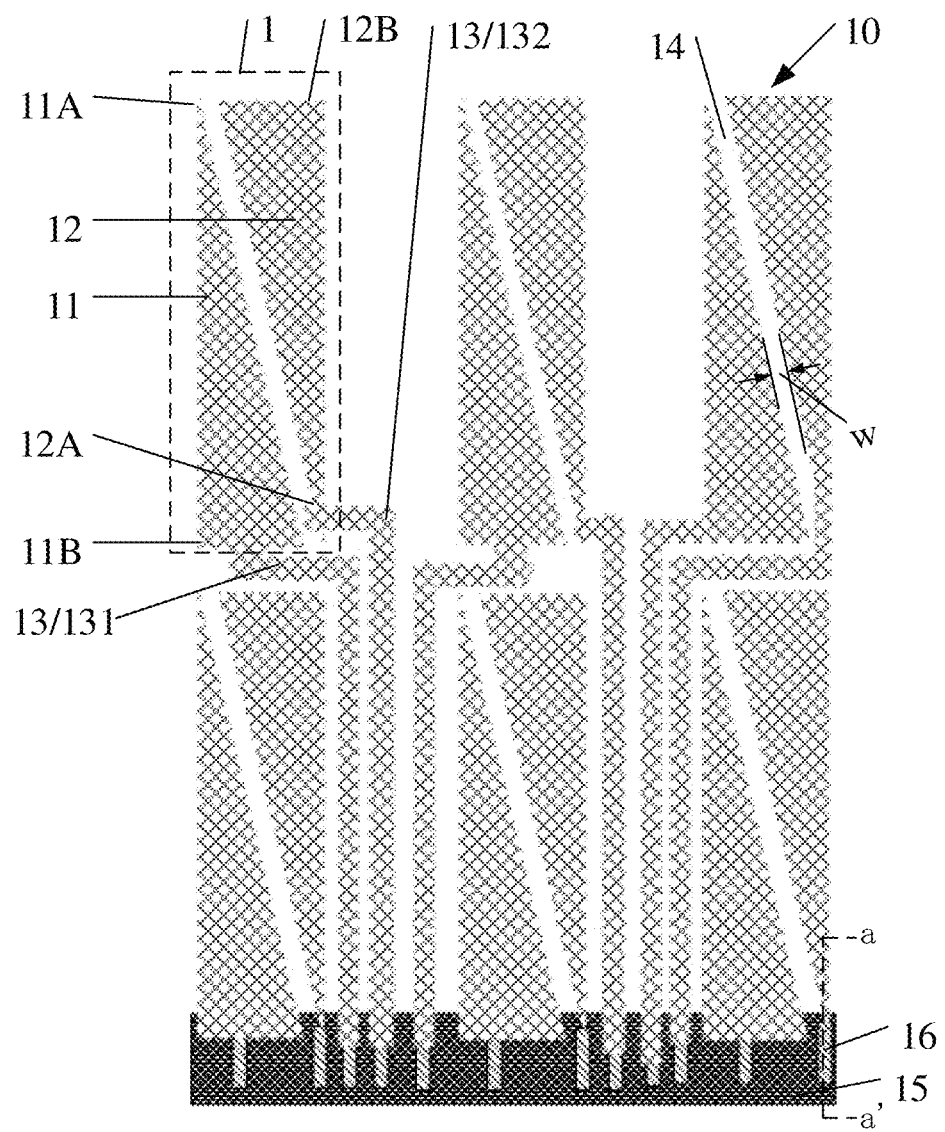
FIG. 1A is a schematic top view of a touch structure according to at least one embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, technical terms or scientific terms used in the present disclosure are intended to be understood in the ordinary meaning of the ordinary skill of the art. The words "first", "second", and similar terms used in the present disclosure do not indicate any order, quantity, or importance, but are used to distinguish different components. The words "comprise", "include" or the like means that the elements or items preceding the word include the elements or items after the word and their equivalents, but do not exclude other elements or items. The words "connect", "interconnect" or the like are not limited to physical or mechanical connections, but may include electrical connections, either directly or indirectly. The words "upper", "lower", "left", "right" and the like are only used to indicate the relative positional relationships, and when the absolute position of the object described is changed, the relative positional relationship may also change accordingly.

Embodiments of the present disclosure provide a touch structure, a method of manufacturing the touch structure, a touch device including the touch structure, and a method for determining a touch position by using the touch structure. The touch structure includes one or more first touch units that are periodically arranged and a plurality of first traces. The first touch unit includes a first touch electrode and a second touch electrode, the first touch electrode and the second touch electrode are adjacent to each other and are insulated from each other. The first touch electrode and the second touch electrode are both self-capacitance electrodes. The first trace includes a first sub-trace and a second sub-trace. Touch driving signals are respectively applied to the first touch electrode through the first sub-trace and the second touch electrode through the second sub-trace and respective sensing signals are detected. In this way, the multi-touch can be realized by using the self-capacitance principle.

In an embodiment of the present disclosure, in one first touch unit, the first touch electrode and the second touch electrode being adjacent to each other means that no other touch electrode is disposed between the first touch electrode and the second touch electrode.

In embodiments of the present disclosure, the first touch electrode and the second touch electrode may be a first wedge-shaped touch electrode and a second wedge-shaped touch electrode, respectively. The wedge shape includes a thick end and a thin end, the width of the wedge shape gradually increases from the thin end to the thick end. The wedge-shaped touch electrode means that the profile of the planar shape of the touch electrode is wedge-shaped, that is, the shape of the orthographic projection of the first touch electrode on the carrier substrate on which the first touch electrode is located is wedge-shaped, and the shape of the orthographic projection of the second touch electrode on the carrier substrate on which the second touch electrode is located is wedge-shaped. In this case, the first touch electrode and the second touch electrode each include a thin end and a thick end, the thin end and the thick end are arranged opposite to each other. The width of each of the first touch electrode and the second touch electrode gradually increases from its thin end to its thick end.

For example, the wedge shape described above may be triangular, or trapezoidal or any other shapes similar with triangular or trapezoidal, as long as the width of the wedge shape gradually increases from the thin end to the thick end. For example, the wedge shape may be a right-angled triangle, an isosceles triangle, an equilateral triangle, a non-isosceles right-angled triangle, a right-angled trapezoid, an isosceles trapezoid, a right-angled triangle having a serrated hypotenuse, a sector or a non-isosceles right-angled trapezoid.

Hereinafter, embodiments of the present disclosure will be described in detail with reference to the accompanying drawings.

At least one embodiment of the present disclosure provides a touch structure. As illustrated in FIG. 1A, the touch structure includes one or more first touch units 1 (e.g., the plurality of first touch units 1 are arranged in a plurality of rows and columns). The first touch unit 1 includes a first touch electrode 11 and a second touch electrode 12 that are adjacent to each other and insulated from each other. Each of the first touch electrode 11 and the second touch electrode 12 is self-capacitance electrode and includes a thin end (see 11A and 12A) and a thick end (see 11B and 12B) that are arranged opposite to each other. The touch structure further includes a first trace 13. The first trace 13 includes a first sub-trace 131 and a second sub-trace 132. The first touch electrode 11 is coupled with the first sub-trace 131, and the second touch electrode 12 is coupled with the second sub-trace 132, thus, the first touch electrode 11 and the second touch electrode 12 are coupled to a touch detection circuit (not illustrated) through the first sub-trace 131 and the second sub-trace 132, respectively.

For example, as illustrated in FIG. 1A, the touch structure further includes a plurality of electrode pins 16 coupled to the plurality of first traces 13 for connecting the respective first traces to the touch detection circuit.

Figure 1B:
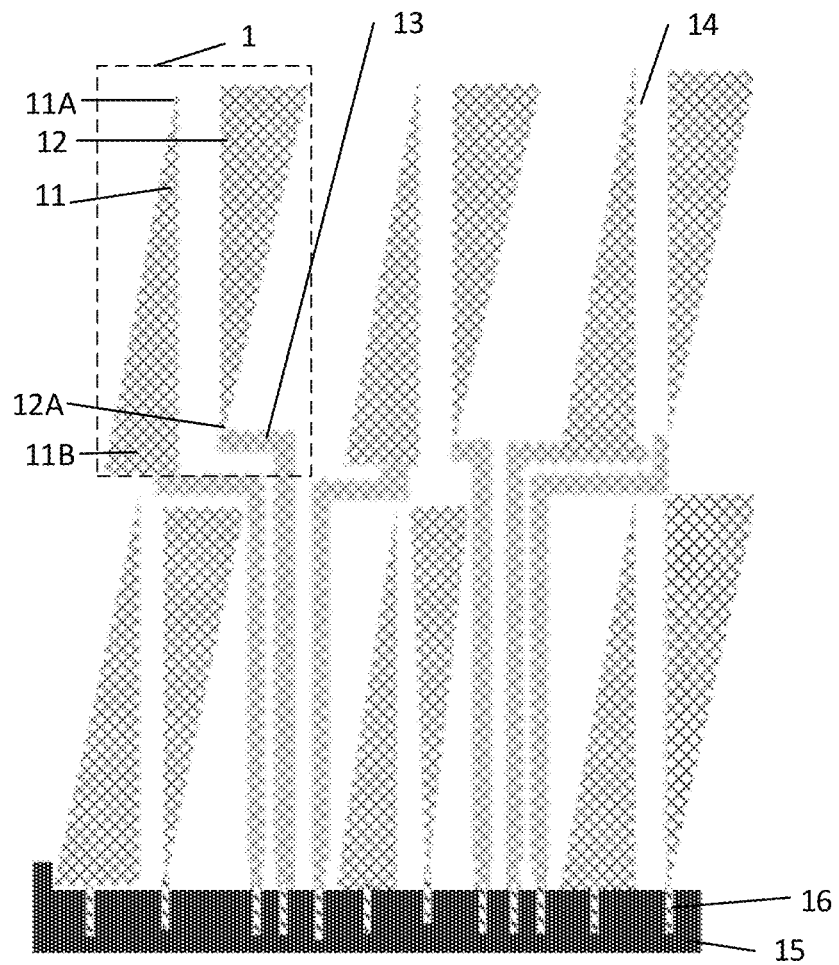
FIG. 1B is a schematic top view of another touch structure according to at least one embodiment of the present disclosure.
Figure 1C:
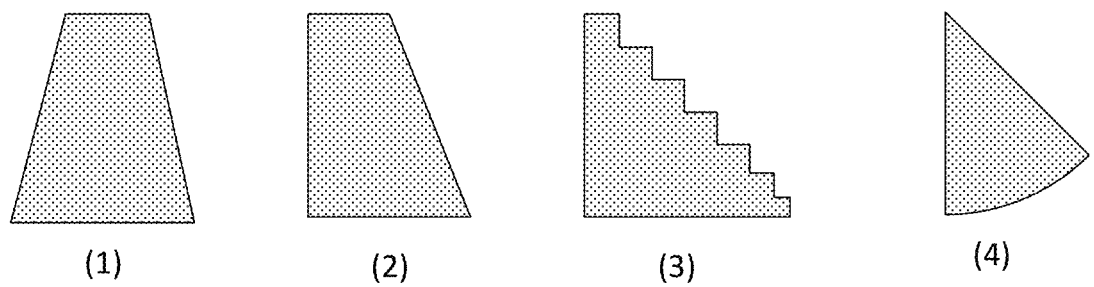
FIG. 1C is a schematic top view of a first touch electrode or a second touch electrode according to at least one embodiment of the present disclosure.
Figure 1D:
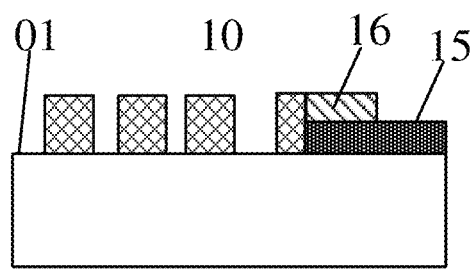
FIG. 1D is a schematic cross-sectional view of the touch structure of FIG. 1A according to at least one embodiment of the present disclosure.

For example, FIG. 1D is a schematic cross-sectional view of the touch structure illustrated in FIG. 1A. The cut line is the a-a' line illustrated in FIG. 1A. As illustrated in FIG. 1A and FIG. 1D, the touch structure further includes a black frame. The electrode pin 16 is located in an area where the black frame 15 is located to avoid being viewed by a user, which affects the appearance.

It should be noted that there is a gap between the three adjacent first touch electrode layers 10 in FIG. 1D because the first touch electrode layers 10 are a grid-like structure formed of metal.

For example, as illustrated in FIG. 1A, the first touch electrode 11 and the second touch electrode 12 are located in the same layer (see the first touch electrode layer 10) (for example, the first touch electrode 11 and the second touch electrode 12 are located side by side on the carrier substrate 01 (see FIG. 1D)). The materials of the first touch electrode 11 and the second touch electrode 12 are the same. In this way, the first touch electrode 11 and the second touch electrode 12 may be formed by patterning a same film, which simplifies the manufacturing process of the touch structure. For example, the patterning process is a photolithography process including exposure, development, and etching steps.

For example, as illustrated in FIG. 1A, the planar shapes of the first touch electrode 11 and the second touch electrode 12 are substantially the same and an edge of the first touch electrode and an edge of the second touch electrode that are closed to each other are substantially parallel to each other. In this case, the planar shape of the first touch electrode 11 and the second touch electrode 12 substantially have the same size and the same profiles, and each is substantially a right-angled triangle, so the areas of the first touch electrode 11 and the second touch electrodes 12 are substantially equal to each other. Because the edge of the first touch electrode 11 and the edge of the second touch electrode 12 that are closed to each other (i.e., the adjacent edges of the two) are substantially parallel, the planar shapes of the first touch electrode 11 and the second touch electrode 12 are complementary. This facilitates the determination of a touch position by using the first touch electrodes 11 and second touch electrode 12 and helps to increase the touch sensitivity and avoid erroneous determination.

For example, as illustrated in FIG. 1A, in the case where the touch structure includes a plurality of the first touch units 1 arranged in a plurality of rows and columns, the thin ends 11A of a plurality of the first touch electrodes 11 located in the same row have the same orientation and are oriented toward the side facing away from the black frame 15; the thin ends 12A of a plurality of the second touch electrodes 12 located in the same row have the same orientation and are oriented toward a side facing the black frame 15; moreover, among the adjacent first touch units 1 in the same row, the second touch electrode 12 in the left first touch unit 1 has an edge adjacent to an edge of the first touch electrode 11 in the right first touch unit 1, and the two adjacent edges are substantially parallel to each other. Such an arrangement can make the plurality of first touch units 1 arranged regularly, thereby simplifying the fabrication process, simplifying the determination of the gap between the adjacent first touch units, and increasing the touch precision.

For example, as illustrated in FIG. 1A, the thin end of the first touch electrode 11 is close to the thick end of the second touch electrode 12, and the thick end of the first touch electrode 11 is close to the thin end of the second touch electrode 12. Such an arrangement helps to achieve a complementation between the planar shapes of the first touch electrode 11 and the second touch electrode 12. For example, as illustrated in FIG. 1A, the planar shape of the first touch unit formed by complementing the first touch electrode 11 and the second touch unit 12 are substantially rectangle. In the same first touch unit, the two right-angled sides of the touch electrode 11 and the second touch electrode 12 are both oriented outwardly and the oblique sides of the first touch electrode 11 and the second touch electrode 12 are parallel to each other.

The manner in which the first touch electrodes 11 and the second touch electrodes 12 are complementary to each other and the arrangement of the plurality of first touch units 1 as illustrated in FIG. 1A are described for illustrative purposes only, and embodiments of the present disclosure include but are not limited thereto.

For example, the touch structure illustrated in FIG. 1A includes two rows and three columns of the first touch units 1. In the row direction, a gap is between every two adjacent first touch units 1, and the widths of the gaps are the same or not. The first sub-trace 131 and the second sub-trace 132 respectively coupled to the first touch electrode 11 and the second touch electrode 12 of the leftmost first touch unit 1 in the first row are located in a first gap, and the first sub-trace 131 coupled to the first touch electrode 11 of the middle first touch unit 1 in first row is also located in the first gap. The first gap is a gap between the leftmost first touch unit and the middle first touch unit in the second row. The first sub-trace 131 and the second sub-trace 132 respectively coupled to the first touch electrode 11 and the second touch electrode 12 of the rightmost first touch unit 1 in the first row, and the second sub-trace 132 coupled to the second touch electrode 12 of the middle first touch unit 1 in first row are located in a second gap. The second gap is a gap between the rightmost first touch unit and the middle first touch unit in the second row. Such a design allow the first trace 13 to be located between the first touch units 1 instead of being disposed on the periphery of an entirety formed by all the first touch units. Thus, a narrower frame design can be realized. Additionally, along the periphery of the entirety formed by all the first touch units, except that the black frame 15 is formed on the lowest end of the periphery, the other three sides does not have a frame. Thus, the three-side frameless multi-point touch can be realized.

For example, FIG. 1B is a schematic top view of another touch structure according to at least one embodiment of the present disclosure. As illustrated in FIG. 1B, the planar shapes of the first touch electrode 11 and the second touch electrode 12 are substantially the same in shape and are both substantially right-angled triangles, and the longer right-angled sides of the first touch electrode 11 and the second touch electrode 12 are close to each other and substantially parallel to each other. In this case, the planar shapes of the first touch electrode 11 and the second touch electrode 12 have the substantially same profile and the substantially same size, so the areas of the first touch electrode 11 and the second touch electrode 12 are substantially equal to each other. Because the edge of the first touch electrode 11 and the edge of the second touch electrode 12 that are closed to each other (i.e., the adjacent edges of the two) are substantially parallel to each other, the planar shapes of the first touch electrode 11 and the second touch electrode 12 are complementary. This facilitates the determination of a touch position by using the first touch electrodes 11 and second touch electrode 12 and helps to increase the touch sensitivity and avoid erroneous determination.

For example, as illustrated in FIG. 1B, in the case where the touch structure includes the plurality of the first touch units 1 arranged in a plurality of rows and columns, the thin ends 11A of the plurality of the first touch electrodes 11 located in the same row have the same orientation and are oriented toward the side facing away from the black frame 15; the thin ends 12A of the plurality of the second touch electrodes 12 located in the same row have the same orientation and are oriented toward a side facing the black frame 15; moreover, among the adjacent first touch units 1 in the same row, the second touch electrode 12 in the left first touch unit 1 has an edge adjacent to an edge of the first touch electrode 11 in the right first touch unit 1, and the two adjacent edges are substantially parallel to each other. Such an arrangement can make the plurality of first touch units 1 arranged regularly, thereby simplifying the fabrication process, simplifying the determination of the gap between the adjacent first touch units, and increasing the touch precision.

For example, as illustrated in FIG. 1B, the thin end of the first touch electrode 11 is close to the thick end of the second touch electrode 12, and the thick end of the first touch electrode 11 is close to the thin end of the second touch electrode 12. Such an arrangement helps to achieve a mutual matching between the planar shapes of the first touch electrode 11 and the second touch electrode 12. For example, as illustrated in FIG. 1B, the planar shape of the first touch unit formed by complementing the first touch electrode 11 and the second touch unit 12 is parallelogram. The right-angled sides of the touch electrode 11 and the second touch electrode 12 in the same first touch unit 1 are both oriented inwardly, the longer right-angled sides of the touch electrode 11 and the second touch electrode 12 are parallel to each other, and the oblique sides of the first touch electrode 11 and the second touch electrode 12 are oriented outwardly.

It should be noted that the arrangement and the number of the first touch units in the embodiments of the present disclosure are not limited to the related descriptions in the foregoing.

For example, FIG. 1C is a schematic top view of a first touch electrode or a second touch electrode according to at least one embodiment of the present disclosure. As illustrated in FIG. 1C, the profile of the shape of the first touch electrode or the second touch electrode seen from the top may be trapezoid (including an isosceles trapezoid (1) and a right-angled trapezoid (2)), a triangle (3), or a sector (4). It can be understood that the sides of each shape may include a concave-convex structure. For example, the oblique side of the triangle (3) in FIG. 1C is serrated. The radius angle of the sector is 60 degrees or less.

The principle of determining a touch position by using the touch structure according to the embodiments of the present disclosure will be described below with reference to FIG. 2A and FIG. 2B. Hereinafter, for convenience of description, the direction in which the shortest distance from the thin end to the thick end of each touch electrode is referred to as an extended length direction of the touch electrode, and the direction perpendicular to the extended length direction is referred to as a width direction of the touch electrode.

Figure 2A:
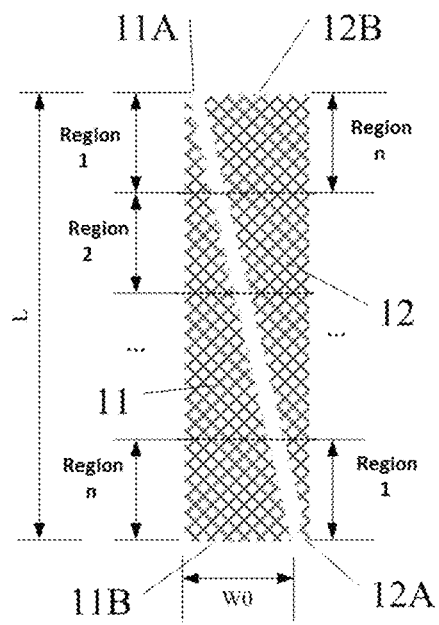
FIG. 2A is a schematic view showing a region distribution of a first touch electrode and a second touch electrode in a touch structure according to at least one embodiment of the present disclosure.

For example, as illustrated in FIG. 2A, the profiles of the shapes of the first touch electrode and the second touch electrode seen from the top are triangle. In the extended length direction of each touch electrode (see the vertical direction in FIG. 2A), the touch electrode is divided into n regions (region 1, region 2 . . . , region n) whose areas changes sequentially, and the n regions are substantially equal in size in the extended length direction. For example, the extended length of the touch electrode can be divided according to the width of the thick end of the touch electrode (see WO in FIG. 2A). In this case, the size of the divided n regions along the extended length direction is substantially equal to WO, and for both the first touch electrode 11 and the second touch electrode 12, the ratio of the extended length L to the width WO of the thick end is greater than or equal to n and less than n+1. That is, the ratio is in a range of [n, n+1), where n is a positive integer. For example, n is greater than or equal to 2. It can be understood that when the first touch electrode and the second touch electrode each seen from the top is in shape of a triangle, the width WO of the thick end is the length of the shortest side of the triangle, and the extended length is the height corresponding to the shortest side of the triangle. When the first touch electrode and the second touch electrode each seen from the top is in shape of a trapezoid, the width WO of the thick end is the length of the lower bottom side of the trapezoid, and the extended length is the height of the trapezoid. When the first touch electrode and the second touch electrode each seen from the top is in shape of a sector, the width WO of the thick end is the length of an arc corresponding to the sector, and the extended length is the radius of the circle where the sector is located.

In the example illustrated in FIG. 2A, the areas of the region 1 to the region n is successively increased. Because the areas of the region 1 to the region n are different from one another, the amount of change in signals (i.e., the amount of change in self-capacitance) in the different regions due to the touch are different from one another. Therefore, the regions 1 to n correspond to n ranges in which the amount of change in signal is successively increased. When a touch object (for example, a user's finger) touches any point on the first touch unit, the signals of the first touch electrode 11 and the second touch electrode 12 that are closest to the touch object are changed, and the touched position can be calculated according to the range where the amount of change in signals of the first touch electrode 11 and the second touch electrode 12 is located.

In the case where the touch structure includes a plurality of first touch units, the single touch can simultaneously cause three or more signals on the first touch electrodes 11 and the second touch electrodes 12 to change. Because the first touch electrode 11 and the second touch electrode 12 that are touched have thick ends and thin ends (for example, the first touch electrode 11 and the second touch electrode 12 are in shape of a wedge shape), in the case that the different regions of each of the first touch electrodes 11 and each of the second touch electrodes 12 are touched, the amount of changes in the self-capacitance of the different regions are different from one another. Therefore, the first touch electrode 11 and/or the second touch electrode 12 that is touched can be determined according to the amount of change in self-capacitance. An accurate detection of the touch position can be achieved according to which region of the touched first touch electrode 11 and/or the touched second electrode 12 is touched.

Figure 2B:
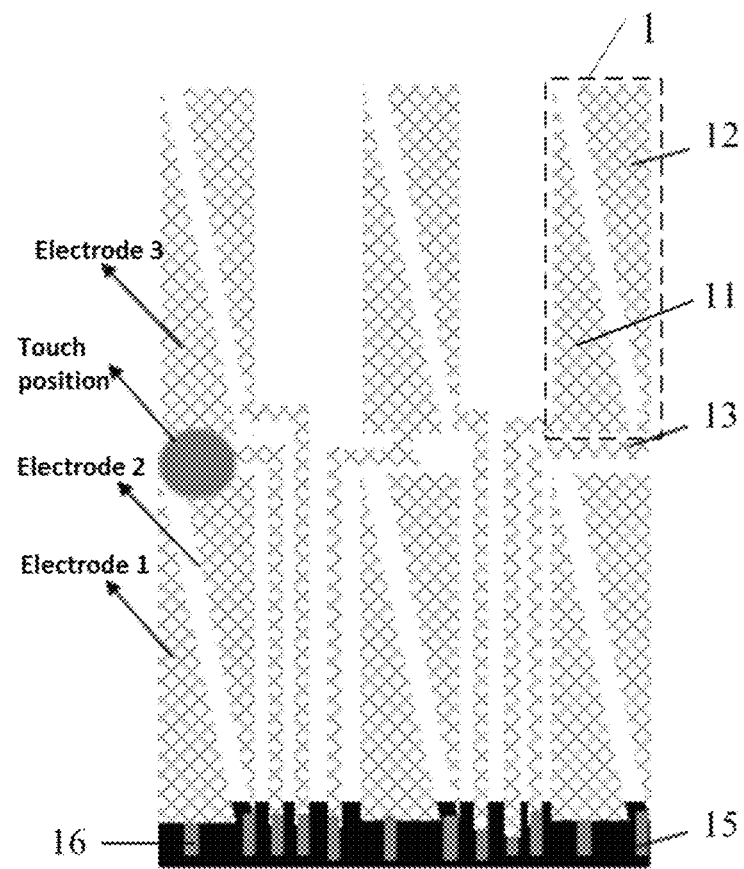
FIG. 2B is a schematic view of a touch structure that is touched according to at least one embodiment of the present disclosure.

For example, as illustrated in FIG. 2B, a single touch simultaneously causes the signals of an electrode 1, an electrode 2 and an electrode 3 to change. After analyzing the amount of changes in signals of the electrode 1, the electrode 2 and the electrode 3, we know that a region 1 of the electrode 1 is touched, a region n of the electrode 2 is touched, and a region n of the electrode 3 is touched, and the touch position can be determined.

It should be noted that it may be any one or two of the electrode 1, the electrode 2, and the electrode 3 that are touched.

For example, the principle of determining the touch position includes: in the case where no touch occurs, inputting a driving signal to the first touch electrodes and the second touch electrodes in each of the first touch units in the touch structure first, and then scanning the sensing signals of each of the first touch electrodes and each of the second touch electrodes to obtain basic signals; dividing each of the first touch electrodes and each of the second touch electrodes into n regions along the extended length direction thereof (as illustrated in FIG. 2A) and determining the signal variation ranges corresponding to the amount of change in signals of the n regions, that is, obtaining n ranges; after that, detecting all the first touch electrodes and the second touch electrodes whose signals are changed to obtain the touched electrodes, (for example, the signals of the electrode 1, the electrode 2 and the electrode 3 in FIG. 2B are changed while the signals of the other electrodes are not changed, and thus the electrode 1, the electrode 2 and the electrode 3 are touched electrodes); finally, determining the touch position according to the positional relationship among the plurality of touched electrodes and the amount of change in signal of each touched electrode (for example, it can be determined that the region 1 of the electrode 1, the region n of the electrode 2, and the region n of the electrode 3 in FIG. 2B are touched and thus the touch position can be determined (see position of the solid circle in FIG. 2B).

In an embodiment of the present disclosure, as described above, a single touch causes changes in signals of the plurality of the first touch electrodes and/or changes in signals of the second touch electrodes. The touch position can be determined by analyzing the change in signals of the plurality of first touch electrodes and/or the changes in signals of second touch electrodes. In a case where a plurality of positions of the touch structure are simultaneously touched, the first touch electrodes and/or the second touch electrodes with changed signals and corresponding to the different positions are different, and therefore these positions can be accurately determined. That is, multi-touch can be realized.

For example, in other embodiments, in a case where the single touch causes a change in signal of only one first touch electrode or only one second touch electrode, because the n regions divided in the touch electrode correspond to different signals variation ranges. Thus, the touch position can still be determined by analyzing the signal variation range in which the amount of change in signal of the touch electrode is located.

For example, in other embodiments, in a case where the first touch electrode or the second touch electrode has only one region (i.e., n=1), the touch position can be determined by performing a single touch to cause changes in signals of the plurality of first touch electrodes and/or changes in signals of second touch electrodes.

When a user's finger touches the touch structure, the contact area between the finger and the touch structure is about 5 mm*5 mm (millimeter). In order to make the touch structure suitable for recognizing the touch of the finger, for example, the width W0 of the thick end of the touch electrode may be set to be greater than or equal to 4 mm and less than or equal to 8 mm. In this case, the size of each of the first touch units 1 in the row direction is approximately from 4 mm to 8 mm.

In order to change the signals of the plurality of the first touch electrodes and/or the signals of the plurality of the second touch electrodes upon a single touch, the distance between the first touch electrode and the second touch electrode that are adjacent is not too long. For example, as illustrated in FIG. 1A, a gap 14 is provided between the first touch electrode 11 and the second touch electrode 12 (for example, the gap is filled with an insulating material), and the width of the gap 14 (see w in FIG. 1A) is less than or equal to 30 μm (micrometers). In the case where the first touch electrodes 11 and the second touch electrodes 12 are fabricated by a photolithography process, the width of the gap 14 is, for example, greater than or equal to 5 μm, which is limited by the precision of the photolithography process itself.

For example, as illustrated in FIG. 1A, the interior of the profiles of the planar shapes of the first touch electrode 11 and the second touch electrode 12 are in a grid shape. Using a wedge-shaped touch electrode that is in a grid shape as a whole helps to increase the transmittance of the touch structure.

In the case where the first touch electrode 11 and the second touch electrode 12 are both in a grid shape, the materials of the first touch electrode 11 and the second touch electrode 12 are both metal. Due to the good ductility of the metal, the use of the first touch electrode 11 and the second touch electrode 12 that are in a grid shape and made of a metal makes the touch structure suitable for use in a flexible touch device (for example, a flexible touch display device).

For example, the carrier substrate 01 is a transparent flexible substrate for use in a flexible touch device.

For example, the first touch electrode 11 and the second touch electrode 12 may be made of material comprising at least one of aluminum, aluminum alloy, copper, copper alloy, ferrum, zirconium, or titanium.

For example, as illustrated in FIG. 1A, the first touch electrode 11 and the second touch electrode 12 each include a plurality of wires intersecting one another to form a grid shape, the grid shape has a plurality of closed hollow portions. For example, the wires constituting the grid pattern are inclined with respect to the row direction and the column direction.

For example, the planar shape of each of the first traces 13 is a grid shape, and the hollow portion in the grid shape allow the first traces 13 to be less visible to the user.

For example, the first trace 13 is made of a metal material. For example, the first trace 13 may be made of material comprising aluminum, aluminum alloy, copper, copper alloy, ferrum, zirconium, or titanium.

For example, the first trace 13, the first touch electrode 11 and the second touch electrode 12 are located in the same layer 10 and are made of the same material, and thus the first trace 13, the first touch electrode 11 and the second touch electrode 12 may be formed by the same patterning process using the same film, which simplifies the manufacturing process and reduces the production cost.

For example, in order to realize a narrower frame or a three-sided frameless structure, a plurality of electrode pins 16 are located on the same side of the touch area surrounded by the plurality of first touch units 1 (see the side on which the black frame 15 is disposed in FIG. 1A). The plurality of first traces 13 are extended in the touch area and leaves the touch area from the side of the touch area same as the electrode pins 16 so as to electrically connect to the electrode pins 16. That is, each of the first traces 13 includes a first end coupled to the corresponding first touch electrode or the second touch electrode, a second end coupled to the electrode pin 16, and an extending portion between the first end and the second end. The extending portion is extended within the touch areas and is coupled to the electrode pin 16 after leaving from the side of the touch area same as the black frame 15 (the side is the length direction side of the black frame 15). With such a wire arrangement, for example, a three-sided frameless structure (for example, a flexible three-sided frameless multi-touch screen) can be realized, see FIG. 1A.

For example, the electrode pins 16 are made of a metal material. For example, the electrode pins 16, the first traces 13, the first touch electrodes 11, and the second touch electrodes 12 are all formed from the same metal layer by using the same patterning process so as to simplify the fabrication process and reduce the production cost.

In a research, the inventor of the present application noticed that if the touch structure is used to recognize the touch of the active pen, the size of the touch unit needs to be reduced to about 4 mm to obtain higher touch sensitivity. However, this may result in a wider frame.

At least one embodiment of the present disclosure further provides another touch structure including two touch electrode layers to achieve higher sensitivity. For example, by increasing the sensitivity, the touch structure can recognize the touch of the active pen. For example, by designing the traces in the two touch electrode layers, it is possible to achieve a narrow frame or a three-sided borderless structure while achieving higher sensitivity. Description will be made below with reference to FIGS. 3A to 3D.

Figure 3A:
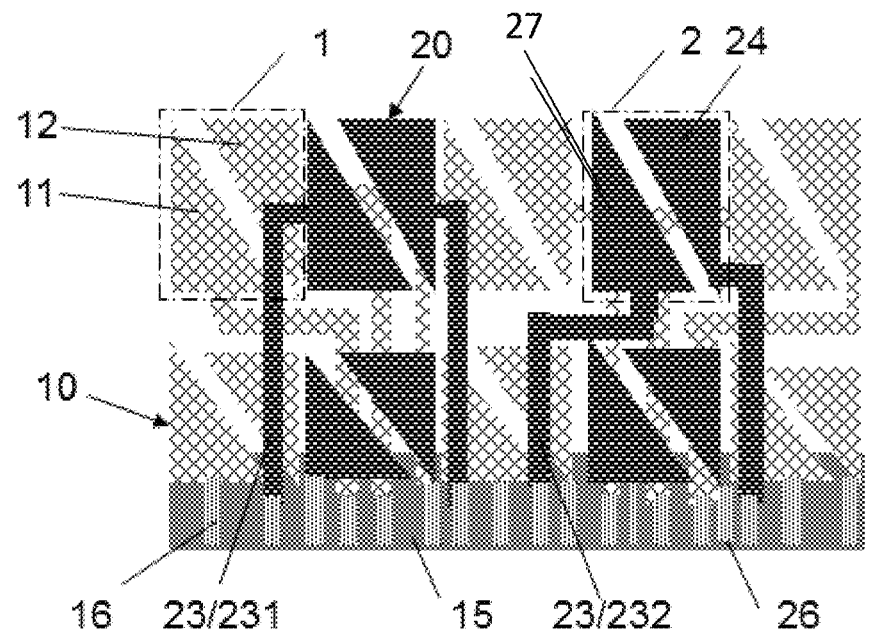
FIG. 3A is a schematic top view of still another touch structure according to at least one embodiment of the present disclosure.

For example, as illustrated in FIG. 3A, at least one embodiment of the present disclosure provides a touch structure. The touch structure includes the first touch unit 1, and further includes a second touch unit 2. The second touch unit 2 includes a third touch electrode 27 and a fourth touch electrode 24 that are adjacent to each other and insulated from each other. Both the third touch electrode 27 and the fourth touch electrode 24 are self-capacitance electrodes and include a thin end and a thick end that are arranged opposite to each other.

Figure 3B:
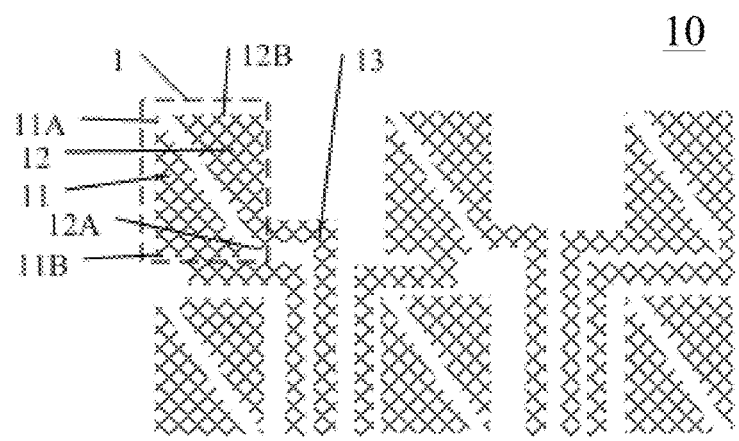
FIG. 3B is a schematic top view of a plurality of first touch units in the touch structure of FIG. 3A according to at least one embodiment of the present disclosure.
Figure 3C:
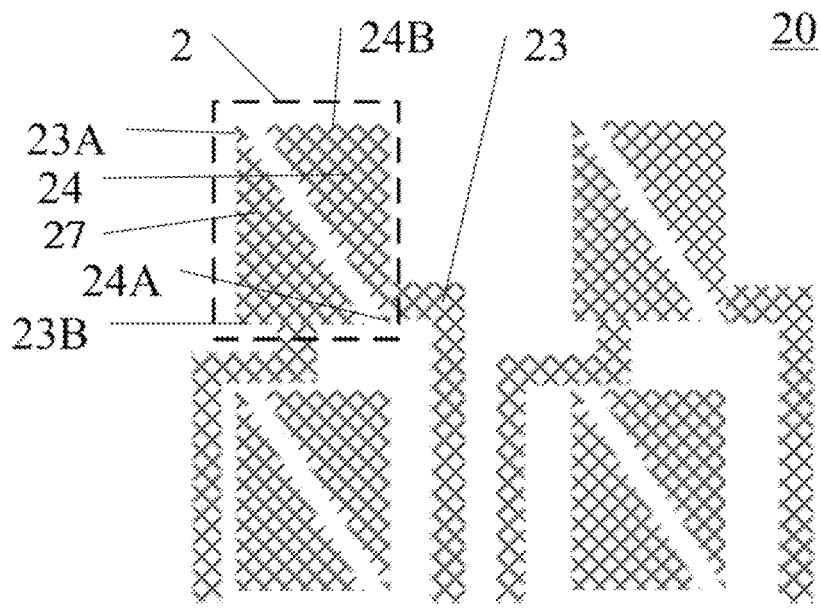
FIG. 3C is a schematic top view of a plurality of second touch units in the touch structure of FIG. 3A according to at least one embodiment of the present disclosure.

As illustrated in FIG. 3A and FIG. 3C, the touch structure further includes a plurality of second traces 23 and a plurality of electrode pins 26 respectively coupled to the second traces 23. The plurality of second traces 23 include a third sub-trace 231 and a fourth sub-trace 232. The third touch electrode 27 is coupled to the third sub-trace 231, and the fourth touch electrode 24 is coupled to the fourth sub-trace 232, thus, the third touch electrode 27 and the fourth touch electrode 24 are coupled to the touch detection circuit through the respective second trace and the respective electrode pin 26.

Figure 3D:
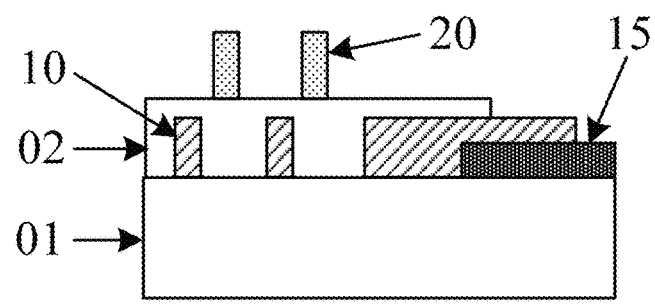
FIG. 3D is a schematic cross-sectional view of the touch structure of FIG. 3A according to at least one embodiment of the present disclosure.

In the embodiment illustrated in FIG. 3A to FIG. 3D, the second touch unit 2 and the first touch unit 1 are located in different layers, that is, the second touch unit 2 and the first touch unit 1 are formed of films on different layers. For example, as illustrated in FIG. 3A to FIG. 3C, the first touch electrode 11 and the second touch electrode 12 in the first touch unit 1 are located in the first touch electrode layer 10, and the third touch electrode 27 and the fourth touch electrode 24 in the second touch unit 2 are located in the second touch electrode layer 20. As illustrated in FIG. 3D, the first touch electrode layer 10 is covered by an insulating layer (e.g., a transparent insulating layer) 02, and the second touch electrode layer 20 is located on a side of the insulating layer 02 away from the first touch electrode layer 10.

As illustrated in FIG. 3A, the second touch unit 2 is located at a position corresponding to the gap between the two adjacent first touch units 1 in the row direction. That is, the orthographic projection of the second touch unit 2 on the carrier substrate 01 is located between the orthographic projections, on the carrier substrate 01, of the two first touch units 1 adjacent to each other in the row direction.

For example, the sizes of the first touch unit 1 and of the second touch unit 2 both in the row direction and in the column direction are in a range from 4 mm to 5 mm, for example, in a range from 4 mm to 4.5 mm. In this case, the distance between the two first touch units 1 adjacent to each other is also in a range from 4 mm to 5 mm. By setting the size of the first touch unit 1 and of the second touch unit 2 both in the row direction and in the column direction being in a range from 4 mm to 5 mm, the touch structure can have higher sensitivity, the touch structure can recognize the touch position of the active pen.

In one aspect, the design illustrated in FIG. 3A to FIG. 3D is adopted. In the case where the touch position is located between the two first touch units 1 adjacent to each other, the touch position can be determined by the second touch unit 2 located between the two adjacent first touch units 1, because the first touch unit 1 and the second touch unit 2 are complementary with each other. Therefore, the design can effectively increase the touch sensitivity, and thus the touch object can be recognized by the touch units when the touch object touches any point in the touch area. Due to the complementation between the electrode layer 10 and the electrode layer 20, the signal change in any function area of the display screen can be effectively recognized at the time of touch.

In another aspect, compared with the manner in which the first touch unit 1 and the second touch unit 2 are in the same layer, the manner in which the first touch unit 1 and the second touch unit 2 are located in different touch electrode layers allows the size of each of the first touch unit 1 and each of the second touch units 2 to be designed to be smaller, so that the touch of the active pen can be recognized.

In still another aspect, compared with the manner in which the first touch unit 1 and the second touch unit 2 are in the same layer, the manner in which the first touch unit 1 and the second touch unit 2 are located in different touch electrode layers allows the distance between the two first touch units adjacent to each other to be relatively large (for example, from 4 mm to 5 mm), and allows the distance between the two second touch units adjacent to each other to be relatively large (for example, from 4 mm to 5 mm). Thus, the first trace 13 and the second traces 23 can be arranged in different layers rather than being sequentially arranged on the same layer. Thus, the width of the first traces 13 and the width of the second traces 23 can be larger, which effectively reduces the impedance.

The planar shape, the material, and the size of the third touch electrode 27 and the fourth touch electrode 24 may be configured by referring to those of the first touch electrode 11 and the second touch electrode 12, and the repeated description is omitted.

The planar shape (for example, the second trace 23 is a grid shape), the position (for example, the second trace is extended within the touch area and leaves the touch area from the side of the touch area same as the black frame 15), and other parameters of the second trace 23 may be configured by referring to those of the first trace 13, and the repeated description is omitted.

For example, the first touch electrode 11, the second touch electrode 12, the third touch electrode 27, and the fourth touch electrodes 24 are all made of metal, and both the first traces 13 and the second traces 23 are extended within the touch area and leave the touch area from the side of the touch area close to the electrode pin 16, 26, so as to electrically connect the touch detection circuit. In this way, a flexible three-sided frameless multi-touch screen for determining the touch of the active pen can be realized.

At least one embodiment of the present disclosure further provides a touch device including the touch structure provided by any of the above embodiments.

For example, the touch device can be an add-on touch display device, an on-cell touch display device, or an in-cell touch display device.

For example, the touch device according to the embodiment of the present disclosure may be a liquid crystal touch panel, an electronic paper, an OLED (Organic Light-Emitting Diode) touch panel, a mobile phone, a tablet computer, a television, a display, a notebook computer, a digital photo frame, a navigator and any product or component with touch function.

At least one embodiment of the present disclosure further provides a method for manufacturing a touch structure. The touch structures illustrated in FIGS. 1A-2B and 3A to 3D are taken as an example. The manufacturing method includes: forming the first touch electrode layer 10. The first touch electrode layer 10 includes the first touch unit 1 and the plurality of first traces 13. The first touch unit 1 includes the first touch electrode 11 and the second touch electrode that are adjacent to each other and insulated from each other. Both the first touch electrode 11 and the second touch electrode 12 are self-capacitance electrodes and include the thin end (see 11A and 12A) and the thick end (see 11B and 12B) that are arranged opposite to each other. Additionally, the first touch electrode 11 and the second touch electrode 12 are coupled to the first sub-trace 131 and the second sub-trace 132, respectively.

For example, for the touch structure illustrated in FIG. 1A and FIG. 1D, the manufacturing method provided by at least one embodiment of the present disclosure includes the following steps S11 to S12.

Step S11: forming the black frame 15 on the carrier substrate 01, as illustrated in FIG. 1D.

For example, the carrier substrate 01 is a transparent flexible substrate.

Step S12: forming a metal layer on the carrier substrate 01, and performing a patterning process (for example, a photolithography process) on the metal layer by using a photomask to form the first touch electrode layer 10, as illustrated in FIGS. 1A and 1D.

For example, in this step, the first touch electrode layer 10 includes the first touch electrode 11, the second touch electrode 12, the first trace 13, and the electrode pin 16. The main bodies of the first touch electrode 11 and of the second touch electrode 12 are in a grid shape.

For example, the manufacturing method provided by at least one embodiment of the present disclosure may be used to simultaneously fabricate a plurality of touch structures at a time. In this case, the manufacturing method further includes the step S13: cutting a mother board obtained after completing the step S12 into a plurality of sub-boards, each of the sub-boards includes the touch structure.

For example, the manufacturing method provided by at least one embodiment of the present disclosure further includes, after completing the above step S13, electrically connecting a flexible printed circuit board (FPC) which is coupled to the touch detection circuit (e.g., an integrated circuit) to the electrode pins 16 on the carrier substrate 01.

According to the above manufacturing method, a single-layer (i.e., only one layer of touch electrode layer) multi-touch screen with a narrow frame, or a three-sided frameless single-layer multi-touch screen can be obtained.

For example, for the touch structure as illustrated in FIG. 3A to FIG. 3D, the manufacturing method provided by at least one embodiment of the present disclosure further includes: forming the second touch electrode layer 20. The second touch electrode layer 20 includes the second touch unit 2 and the plurality of second traces 23. The second touch unit includes the third touch electrode 27 and the fourth touch electrode 24 that are adjacent to each other and insulated from each other. The third touch electrode 27 and the fourth touch electrode 24 are both self-capacitance electrodes and both include the thin end and the thick end that are arranged opposite to each other. The third touch electrode 27 and the fourth touch electrode 24 are respectively coupled with the third sub-trace 231 and the fourth sub-trace 232. The second touch unit 2 is located at a position corresponding to the gap between two adjacent first touch units 1.

For example, for the touch structure as illustrated in FIG. 3A to FIG. 3D, the manufacturing method provided by at least one embodiment of the present disclosure includes the following steps S21 to S24.

Step S11: forming the black frame 15 on the carrier substrate 01, as illustrated in FIG. 3D.

For example, the carrier substrate 01 is a transparent flexible substrate.

Step S22: forming a first metal layer on the carrier substrate 01, and performing a patterning process (for example, a photolithography process) on the first metal layer by using a first photomask to form the first touch electrode layer 10, as illustrated in FIGS. 3A and 3B.

For example, in this step, the first touch electrode layer 10 includes the first touch electrode 11, the second touch electrode 12, the first trace 13, and the electrode pin 16. The main bodies of the first touch electrode 11 and of the second touch electrode 12 are in a grid shape.

Step S23: forming the insulating layer 02 covering the first touch electrode layer 10 by using a second photomask, and the insulating layer 02 does not cover the area where the black frame 15 is located (i.e., the bonding area).

For example, the insulating layer 02 is a transparent insulating layer. For example, the insulating layer 02 covers the entire touch area.

Step S24: forming a second metal layer on the insulating layer 02, and performing a patterning process (for example, a photolithography process) on the second metal layer by using a third photomask to form the second touch electrode as illustrated in FIG. 3A and FIG. 3C.

For example, in this step, the second touch electrode layer 20 includes the third touch electrode 27, the fourth touch electrode 24, the second trace 23, and the electrode pin 26, and the third touch electrode 27 and the fourth touch electrode 24 are in a grid shape as a whole.

For example, the manufacturing method provided by at least one embodiment of the present disclosure may be used to simultaneously fabricate a plurality of touch structures at a time. In this case, the manufacturing method further includes the step S25: cutting a mother board obtained after completing the step S24 into a plurality of sub-boards, each of the sub-boards includes the touch structure.

For example, the manufacturing method provided by at least one embodiment of the present disclosure further includes, after completing the above step S25, electrically connecting a flexible printed circuit board (FPC) which is coupled to the touch detection circuit (e.g., an integrated circuit) to the electrode pins 16 and 26 on the carrier substrate 01.

According to the manufacturing method above, a double-layer multi-point touch screen with narrow frame, or a three-sided frameless double-layer multi-point touch screen can be realized.

Figure 4:
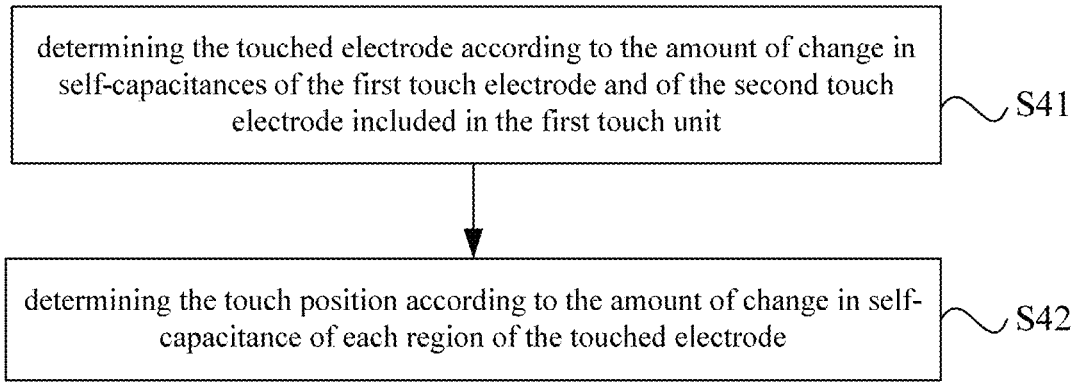
FIG. 4 is a flowchart of a method for determining a touch position according to at least one embodiment of the present disclosure.

At least one embodiment of the present disclosure provides a method for determining a touch position by using the touch structure of the afore-mentioned embodiment in which the touch structure includes only the first touch unit. For example, FIG. 4 is flowchart of a method for determining a touch position according to at least one embodiment of the present disclosure. As illustrated in FIG. 4, the method for determining a touch position includes step S41 and step S42.

Step S41: determining the touched electrode, according to the amount of change in self-capacitances of the first touch electrode and of the second touch electrode included in the first touch unit.

In this step, in the case that any of the first touch electrode and the second touch electrode is not touched, the basic signal is detected through the first trace. In the case that at least one of the first touch electrode and the second touch electrode is touched, the change in the self-capacitance of the first touch electrode and the change in the self-capacitance of the second touch electrode can be determined by comparing the detection signals of the first touch electrode and/or the second touch electrode with the basic signal respectively, and thus the touched electrode is determined.

For example, in the case that no touch occurs, the driving signal is input to all the first touch electrodes and all the second touch electrodes in the touch structure first, and then the sensing signal of each of the first touch electrodes and each of the second touch is scanned to obtain the basic signal.

Step S42: determining the touch position, according to the amount of change in self-capacitance of each region of the touched electrode.

In this step, because the touched electrode has the thick end and the thin end (for example, the touched electrode is in shape of a wedge shape), the amount of change in self-capacitance of the different regions of the touched electrode are different when the different regions are touched. Thus, according to the amount of change in self-capacitance of each region, it is possible to determine which region of the touched electrode is touched so as to determine the touched position.

Figure 5:
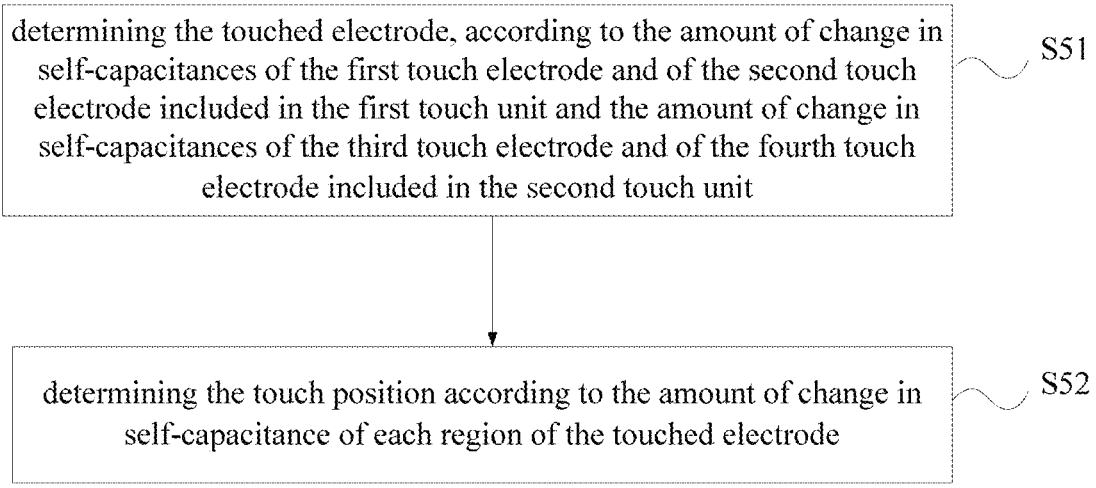
FIG. 5 is a flowchart of another method for determining a touch position according to at least one embodiment of the present disclosure.

At least one embodiment of the present disclosure provides a method for determining a touch position by using the touch structure of the afore-mentioned embodiment in which the touch structure includes the first touch unit and the second touch unit. For example, FIG. 5 is a flowchart of a method for determining a touch position according to at least one embodiment of the present disclosure. As illustrated in FIG. 5, the touch positioning method includes step S51 and step S52.

Step S51: determining the touched electrode, according to the amount of change in self-capacitances of the first touch electrode and of the second touch electrode included in the first touch unit and the amount of change in self-capacitances of the third touch electrode and of the fourth touch electrode included in the second touch unit.

In this step, in the case that none of the first touch electrode, the second touch electrode, the third touch electrode, and the fourth touch electrode is touched, the basic signal is detected through the first trace and the second trace; in the case that at least one of the first touch electrode, the second touch electrode, the third touch electrode, and the fourth touch electrode is touched, the change in the self-capacitance of the first touch electrode, the change in the self-capacitance of the second touch electrode, the change in the self-capacitance of the third touch electrode, and the change in the self-capacitance of the fourth touch electrode can be determined by comparing the detection signals of the first touch electrode, the second touch electrode, the third touch electrode, and the fourth touch electrode with the basic signal respectively, and thus the touched electrode is determined.

For example, in the case that no touch occurs, the driving signal is input to all the first touch electrodes, all the second touch electrodes, all the third touch electrodes, and all the fourth touch electrodes in the touch structure first, and then the sensing signals of each of the first touch electrodes, each of the second touch electrodes, each of the third touch electrodes, and each of the fourth touch electrodes are scanned to obtain a basic signal.

Step S52: determining the touch position according to the amount of change in self-capacitance of each region of the touched electrode.

In this step, because the touched electrode has the thick end and the thin end (for example, the touched electrode is in shape of a wedge shape), the amount of change in self-capacitance of the different regions of the touched electrode are different when the different regions are touched. Thus, according to the amount of change in self-capacitance of each region of the touched electrode, it is possible to determine which region of the touched electrode is touched so as to determine the touched position.

Taking FIG. 2B as an example, the method for determining a touch position provided by at least one embodiment of the present disclosure includes: in the case that no touch occurs, inputting a driving signal to all the touch electrodes in the touch structure and then scanning the sensing signals of each of the touch electrodes to obtain the basic signals; dividing each of the touch electrodes into n regions along the extended length direction thereof (as illustrated in FIG. 2A) and determining the signal variation ranges respectively corresponding to the n regions, that is, obtaining n ranges; after that, detecting all the touch electrodes whose signals are changed to obtain the touched electrodes (for example, the signals of the electrode 1, the electrode 2 and the electrode 3 in FIG. 2B are changed while the signals of the other electrodes are not changed, and thus the electrode 1, the electrode 2 and the electrode 3 are touched electrodes); finally, determining the touch position according to the positional relationship among the plurality of touched electrodes and the amount of change in signal of each touched electrode; for example, it can be determined that the region 1 of the electrode 1, the region n of the electrode 2, and the region n of the electrode 3 in FIG. 2B are touched and thus the touch position can be determined (see position of the solid circle in FIG. 2B).

In summary, the embodiment of the present disclosure provides a touch structure and a method for manufacturing the touch structure, a touch device, a method for determining a touch position. The touch structure includes a first touch unit and a first trace. The first touch unit includes a first touch electrode and a second touch electrode that are both self-capacitance electrodes and both have a thin end and a thick end that are arranged opposite to each other. The first touch electrode and the second touch electrode are coupled to different first traces. The touch structure can realize multi-touch, for example, realizing a flexible three-sided frameless multi-point touch screen. In at least another embodiment, by providing a second touch unit different from the first touch unit, and placing the second touch unit between the adjacent first touch units, a touch structure with a higher sensitivity can be realized, for example, a flexible three-sided frameless multi-touch screen that can recognize a touch position of an active pen is realized.

The touch structure and the method for manufacturing the touch structure, the touch device and the method for determining a touch position provided by the embodiment of the present disclosure may be mutually referenced.

What is described above is related to the illustrative embodiments of the disclosure only and not limitative to the scope of the disclosure; the scopes of the disclosure are defined by the accompanying claims.

The invention claimed is:

1. A touch structure comprising:
a first touch unit, comprising a first touch electrode and a second touch electrode, wherein the first touch electrode and the second touch electrode are adjacent to each other and insulated from each other, the first touch electrode and the second touch electrode are both self-capacitance electrodes and both comprise a thin end and a thick end that are arranged opposite to each other;
a first trace, comprising a first sub-trace and a second sub-trace, wherein the first sub-trace is coupled with the first touch electrode, and the second sub-trace is coupled with the second touch electrode;
  a second touch unit, comprising a third touch electrode and a fourth touch electrode, the third touch electrode and the fourth touch electrode are both self-capacitance electrodes; and
  a carrier substrate, wherein the first touch unit and the second touch unit are provided on the carrier substrate and the second touch unit is located in a layer different from the first touch unit, wherein the second touch unit and the first trace overlap with each other in a direction perpendicular to a plane where the carrier substrate is located.

2. The touch structure according to claim 1, wherein a planar shape of the first touch electrode and a planar shape of the second touch electrode both have a wedge-shaped profile, and a main body of the first touch electrode and a main body of the second touch electrode both have a grid shape.

3. The touch structure according to claim 2, wherein the planar shape of the first touch electrode and the planar shape of the second touch electrode are the same and an edge of the planar shape of the first touch electrode and an edge of the planar shape of the second touch electrode that are close to each other are substantially parallel to each other.

4. The touch structure according to claim 2, wherein a gap between the first touch electrode and the second touch electrode has a width less than or equal to 30 micrometers.

5. The touch structure according to claim 4, wherein materials of the first touch electrode and the second touch electrode include metal.

6. The touch structure according to claim 1, wherein the touch structure comprises a plurality of the first traces, the plurality of the first traces are located in a same layer as the first touch unit.

7. The touch structure according to claim 1, wherein a ratio of an extended length of the first touch electrode from the thin end to the thick end to a width of the thick end is in a range of [n, n+1), and a ratio of an extended length of the second touch electrode from the thin end to the thick end to a width of the thick end is in a range of [n, n+1), wherein n is a positive integer.

8. The touch structure according to claim 1, wherein the touch structure comprises a plurality of the first touch units, and the plurality of the first touch units are arranged in an array.

9. The touch structure according to claim 8, wherein thin ends of a plurality of the first touch electrodes located in a same row have a same orientation, and thin ends of a plurality of the second touch electrodes located in a same row have a same orientation.

10. The touch structure according to claim 9, wherein, among two first touch units that are adjacent to each other and located in a same row, an edge of a second touch electrode in one of the two first touch units is adjacent to an edge of a first touch electrode in the other of the two first touch units, and two adjacent edges are substantially parallel to each other.

11. The touch structure according to claim 9, wherein the thin end of the first touch electrode is close to the thick end of the second touch electrode, and the thick end of the first touch electrode is close to the thin end of the second touch electrode.

12. The touch structure according to claim 11, wherein a planar shape of the first touch unit is substantially a parallelogram.

13. The touch structure according to claim 8, further comprising: a plurality of electrode pins configured to be coupled to a plurality of the first traces, wherein the plurality of the electrode pins are located on a side of a touch area same as the plurality of the first touch units, and the plurality of the first traces are configured to be extended within the touch area and leave the touch area from the side of the touch area same as the plurality of electrode pins.

14. The touch structure according to claim 8,
  wherein the third touch electrode and the fourth touch electrode are adjacent to each other and insulated from each other, and the third touch electrode and the fourth touch electrode both comprise a thin end and a thick end that are arranged opposite to each other,
  wherein the touch structure further comprises:
  a second trace, comprising a third sub-trace and a fourth sub-trace, wherein the third sub-trace is coupled with the third touch electrode, and the fourth sub-trace is coupled with the fourth touch electrode,
  wherein the second touch unit is arranged at a position corresponding to a gap between first touch units that are adjacent in a row direction.

15. A touch device, comprising the touch structure according to claim 1.

16. A method of manufacturing a touch structure, comprising:
  forming a first touch electrode layer on a carrier substrate, wherein the first touch electrode layer comprises a first touch unit and a first trace, the first touch unit comprises a first touch electrode and a second touch electrode that are adjacent to each other and insulated from each other, the first touch electrode and the second touch electrode are both self-capacitance electrodes and both comprise a thin end and a thick end that are arranged opposite to each other, the first trace comprises a first sub-trace and a second sub-trace, the first sub-trace is coupled with the first touch electrode, and the second sub-trace is coupled with the second touch electrode; and
  forming a second touch electrode layer on the carrier substrate, wherein the second touch electrode layer comprises a second touch unit, the second touch unit comprises a third touch electrode and a fourth touch electrode, the third touch electrode and the fourth touch electrode are both self-capacitance electrodes,
  wherein the second touch unit is located in a layer different from the first touch unit,
  wherein the second touch unit and the first trace overlap with each other in a direction perpendicular to a plane where the carrier substrate is located.

17. The method according to claim 16,
  wherein the second touch electrode layer further comprises a second trace, the third touch electrode and the fourth touch electrode are adjacent to each other and insulated from each other, the third touch electrode and the fourth touch electrode both comprise a thin end and a thick end that are arranged opposite to each other, the second trace comprises a third sub-trace and a fourth sub-trace, the third sub-trace is coupled with the third touch electrode, the fourth sub-trace is coupled with the fourth touch electrode, and the second touch unit is arranged at a position corresponding to a gap between first touch units that are adjacent in a row direction.

18. A method for determining a touch position by using the touch structure according to claim 1, comprising:
  determining an electrode that is touched according to an amount of change in a self-capacitance of the first touch electrode in the first touch unit and an amount of change in a self-capacitance of the second touch electrode in the first touch unit; and determining the touch position, according to an amount of change in self-capacitance of each region of the electrode that is touched.

19. A method for determining a touch position by using the touch structure according to claim 14, comprising:

determining an electrode that is touched, according to an amount of change in a self-capacitance of the first touch electrode in the first touch unit, and an amount of change in a self-capacitance of the second touch electrode in the first touch unit, and an amount of change in a self-capacitance of the third touch electrode in the second touch unit, and an amount of change in a self-capacitance of the fourth touch electrode in the second touch unit; and determining the touch position, according to an amount of change in self-capacitance of each region of the electrode that is touched.

20. The touch structure according to claim 1, wherein each of the first sub-trace and the second sub-trace comprises wires constituting a grid pattern, the wires are inclined with respect to a row direction and a column direction.

\* \* \* \* \*